United States Patent [19]

Farr et al.

[11] 3,911,141

[45] Oct. 7, 1975

[54] PREPARATION OF MEAT ANALOGUES

[75] Inventors: David Robert Farr, La Tour-de-Peilz; Paul van de Rovaart, Chexbres, both of Switzerland

[73] Assignee: Societe d'Assistance Technique pour Produits nestle S.A., Lausanne, Switzerland

[22] Filed: Oct. 30, 1974

[21] Appl. No.: 519,231

[30] Foreign Application Priority Data
Nov. 22, 1973 Switzerland...................... 16454/73

[52] U.S. Cl. .................. 426/60; 426/250; 426/540; 426/802
[51] Int. Cl.² ........................ A23J 3/00; A23L 1/275
[58] Field of Search ............ 426/177, 250, 802, 60, 426/104

[56] References Cited
UNITED STATES PATENTS
3,765,906  10/1973  Yamaguchi et al............. 426/177 X

*Primary Examiner*—James R. Hoffman
*Attorney, Agent, or Firm*—Watson Leavenworth Kelton & Taggart

[57] ABSTRACT

A process for the production of a meat analogue which comprises subjecting protein to a texturising treatment, a substance containing pigments produced by a mold of the genus Monascus being incorporated in the proteins during the treatment.

9 Claims, No Drawings

PREPARATION OF MEAT ANALOGUES

This invention relates to a process for the production of a meat analogue in which proteins are subjected to a texturising treatment. The invention also relates to the product obtained by this process.

There are already various processes for producing food products which can be eaten instead of meat. Processes of this kind were developed with a view to creating a basic food high in nutritive value, attractive in taste, appearance and texture and reasonable in price. The starting materials used are generally vegetable proteins, especially soya, although fish proteins for example can also be used. The food to be imitated is meat. The imitation effort is directed above all to texture, appearance and taste. In conventional processes, the proteins used as starting material are texturised by subjecting them either to thermoextrusion or to spinning. The requisite flavour and composition of the product can be obtained by incorporating lipids, traces of carbohydrates, mineral salts and flavourings.

Serious problems are encountered in regard both to the appearance and to the keeping properties of the products obtained. On the one hand, potentially suitable colorants are becoming gradually more rare on account of the severity of the toxicity requirements to be satisfied. The available selection of acceptable red colorants is negligible and their price extremely high. Finally, the exact nuance pleasing to the eye is difficult to obtain. On the other hand, the products obtained by conventional processes tend in time to develop a rancid, unappetising smell.

The present invention provides a process for the production of a meat analogue which comprises subjecting proteins to a texturising treatment, a substance containing pigments produced by a mold of the genus Monascus being incorporated in the proteins during treatment.

The aforementioned pigments are preferably red pigments produced by *Monascus purpureus*.

It has been found that it is possible to obtain texturised proteins with a colour more in line with that which the consumer expects of meat by incorporating in the proteins a substance containing pigments of a mold in the genus Monascus, and that the incorporation of this mold is in addition reflected in a remarkable stabilising effect on these proteins. It has also been found that the colour obtained withstands surprisingly well any subsequent heat treatment, such as cooking in water after reconstitution by soaking.

The substance containing the pigments may consist for example of the aforementioned mold itself. It is preferably either a soluble or insoluble fraction of a broth obtained by culturing the mold in aqueous suspension, or the broth itself or an extract obtained by submitting the broth, after concentration or drying, to an extraction treatment with one or more organic solvents. In all these forms, the substance in addition to its colouring effect shows remarkable stabilising properties.

The process according to the invention is applicable equally to extruded proteins and to spun proteins. Thus, in one modification, where the proteins are extracted from seeds, especially soya beans, and then subjected to various treatments before being spun and then put into shape, the substance containing the aforementioned pigments is with advantage added to the proteins after spinning and before they are put into shape.

In another modification, in which a vegetable flour rich in proteins, more especially a defatted soya flour, is moistened and then mechanically worked under pressure at a temperature above 100°C, the pressure subsequently being suddenly lowered, the substance containing the aforementioned pigments is with advantage added to the flour before it is moistened. The substance may be added in the form of the broth obtained by culturing the mold in aqueous suspension. It may be added in a quantity of from 2 to 6% of the weight of the flour. The porous, texturised product thus produced may then be size-reduced and kept for a prolonged period without any change in its colour or odour. Once it has been reconstituted by soaking, it may be boiled for example without giving off any of its red colouring to the cooking water, indicating that the product does not lose any of its pigments in boiling water. This is attributable to the fact that, in its practical application, the process according to the invention is accompanied by a phenomenon as unexpected as it is desirable, namely that the pigments are anchored to the proteins.

The invention is illustrated by the following Examples:

EXAMPLE 1

A nutrient suspension with the following composition is prepared:

| | |
|---|---|
| $KH_2PO_4$ | 3 g/l |
| glucose | 40 g/l |
| yeast extract | 1 g/l |
| water | 1 litre |

This medium is introduced into 2 litre flasks in a quantity of 500 ml of suspension per flask. An inoculum of a strain of *Monascus purpureus* (CBS : Went 10907 = ATCC 16365) is introduced into the flasks. The inoculated flasks are agitated for 36 hours at 25°C in rotary agitators, resulting in the formation of a bright red coloured broth. The complete broth, mycelium and nutrient liquid are lyophilised and the resulting product size-reduced into powder in a laboratory mill.

1 kg of a fat-extracted soya flour containing proteins in a quantity equal to approximately 53% of its dry weight, and 50 g of the lyophilised broth are introduced into a Hobart mixer. The mixer is kept working for 15 minutes, after which a homogeneous mixture of these two products is obtained.

A solution of 10 g of sodium chloride and 10 g of calcium chloride in 292 g of water is prepared and then added to the mixture prepared in the Hobart mixer. After mixing, a powder-form mixture with a water content of 28% is obtained. This powder-form mixture is introduced into a conventional extruder comprising a barrel equipped with three resistance heaters. An endless screw driven by a motor rotates inside the barrel which, at one end, is connected to a feed hopper and, at its other end, to an extrusion die. The powder is then introduced into the feed hopper and the endless screw entrains it into the barrel where it is progressively heated and compressed. The temperature reached is 155°C. The pressure varies from 5 to 150 atms. according to the position along the barrel, amounting to 10 atms. in the extrusion die. On issuing from the extrusion die, the heated and compressed material expands and forms a continuous cylinder of fibrous, porous structure. This textured product contains 7% of water and is brownish-red in colour.

After reconstitution by soaking in boiling water for a period of 20 minutes, the rehydrated product is similar in colour to smoked ham or bacon. The water or juice left after soaking is not red in colour.

EXAMPLE 2

A nutrient solution with the following composition is prepared:

| | |
|---|---|
| glucose | 20 g/l |
| yeast extract | 3 g/l |
| water | 1 litre |

This medium is introduced into 2 litre flasks in a quantity of 500 ml of suspension per flask. An inoculum of a strain of *Monascus purpureus* (CBS : Went 10907 = ATCC 16365) is then introduced into the flasks. The inoculated flasks are agitated for 48 hours at 25°C in rotary agitators, resulting in the formation of a bright red coloured broth. The broth is centrifuged and the supernatant phase lyophilised.

40 g of this lyophilised supernatant phase and 1 kg of defatted soya flour are mixed for 15 minutes in a Hobart mixer. This is followed by the addition of 292 g of water in which 10 g of sodium chloride and 10 g of calcium chloride have been dissolved, resulting in the formation of a powder-form mixture with a water content of 28%. The powder-form mixture is passed through the extruder described in Example 1. It is worked mechanically at 157°C and extruded into the ambient air. A porous, expanded product is obtained which, after rehydration for 20 minutes in boiling water, is similar in colour to smoked ham or bacon. The water or juice left after cooking is not red in colour.

EXAMPLE 3

A culture broth of *Monascus purpureus* is prepared in the same way as described in Example 1. The complete broth, mycelium and nutrient liquid are homogenised and then spray-dried. The powder obtained is subjected to extraction with ethanol.

A conventional alkaline spinning solution based on soya proteins is then prepared. This solution is passed through an extruder which delivers the material in the form of strands. The strands are introduced into an acid coagulation bath where they solidify in the form of fibres. The tow of fibres is removed from the coagulation bath, washed and its pH adjusted to 4.6. The fibres are then squeezed out. 80 g of these fibres, with a dry solids content of 38% are introduced into a tray fixed to a trapping machine.

250 ml of the alcoholic extract prepared beforehand, containing 8 g of *Monascus purpureus* pigments, are poured into the tray. The tow is kept completely submerged in this liquid for 25 minutes whilst, at the same time, subjecting it to vibrations intended to facilitate penetration of the coloured solution into the fibres. A mass uniformly brownish-red in colour is obtained after centrifuging.

The mass is divided into three batches. The first is cooked for 20 minutes in boiling water. The second is cooked for 20 minutes in boiling water to which 10% of cooking salt had been added. A solution of egg white is added to the third batch which is then introduced into a mould where it is heat-treated for 45 minutes to form a block which is cut into cubes. These cubes are cooked in boiling water for 20 minutes. The three cooked products are similar in colour to smoked ham or bacon. The cooking water or juice is slightly pink in colour.

We claim:

1. In a process for the production of a meat analogue which comprises subjecting proteins to a texturising treatment, the improvement which comprises incorporating a substance containing pigments produced by a mold of the genus Monascus in the proteins during said treatment in an amount sufficient to impart color to said meat analogue.

2. A process as claimed in claim 1, wherein the pigments are red pigments produced by *Monascus purpureus*.

3. A process as claimed in claim 1, in which the substance containing the pigments is added to a vegetable flour rich in proteins which is then moistened and worked mechanically under pressure at a temperature above 100°C, after which the pressure is suddenly reduced.

4. A process as claimed in claim 3, wherein the vegetable flour is a solvent-extracted soya flour.

5. A process as claimed in claim 3, wherein the substance containing pigments is added to the flour in a quantity of from 2 to 6% of the weight of the moistened flour.

6. A process as claimed in claim 1, in which proteins extracted from seeds are spun, the substance containing the pigments is added to the proteins and the proteins are then shaped.

7. A process as claimed in claim 6, wherein the proteins are extracted from soya beans.

8. A process as claimed in claim 6, wherein the spun proteins are impregnated with an extract obtained by concentrating or drying a broth obtained by culturing a mold of the genus Monascus in aqueous suspension, and extracting it with at least one organic solvent.

9. A process as claimed in claim 1, wherein the substance containing the pigments is all or part of a broth obtained by culturing the mold of the genus Monascus in aqueous suspension.

* * * * *